US 9,373,077 B1

(12) United States Patent
Cohen et al.

(10) Patent No.: US 9,373,077 B1
(45) Date of Patent: Jun. 21, 2016

(54) SYSTEM AND METHOD FOR IDENTIFYING CONSTRAINT SOLVER CALLS

(71) Applicant: Cadence Design Systems, Inc., San Jose, CA (US)

(72) Inventors: Daniel Asher Cohen, Los Gatos, CA (US); John LeRoy Pierce, Temple, NH (US); Petr William Spacek, Princeton, MA (US); Prasanna Prithviraj Rao, Boston, MA (US)

(73) Assignee: Cadence Design Systems, Inc., San Jose, CA (US)

( * ) Notice: Subject to any disclaimer, the term of this patent is extended or adjusted under 35 U.S.C. 154(b) by 564 days.

(21) Appl. No.: 13/669,976

(22) Filed: Nov. 6, 2012

(51) Int. Cl.
| *G06F 17/50* | (2006.01) |
| *G06N 5/00* | (2006.01) |
| *G06F 11/26* | (2006.01) |
| *G06F 11/263* | (2006.01) |
| *G06F 17/11* | (2006.01) |

(52) U.S. Cl.
CPC ............ *G06N 5/003* (2013.01); *G06F 17/5022* (2013.01); *G06F 11/261* (2013.01); *G06F 11/263* (2013.01); *G06F 17/11* (2013.01)

(58) Field of Classification Search
None
See application file for complete search history.

(56) References Cited

U.S. PATENT DOCUMENTS

| 5,617,510 A * | 4/1997 | Keyrouz et al. ................. 706/45 |
| 2009/0037858 A1* | 2/2009 | Thakur et al. ..................... 716/5 |
| 2009/0265692 A1* | 10/2009 | Godefroid et al. ............ 717/128 |
| 2010/0275169 A1* | 10/2010 | Goswami et al. ................. 716/3 |
| 2014/0067356 A1* | 3/2014 | Goswami et al. .............. 703/14 |

OTHER PUBLICATIONS

"Backtrace—Debugging with GDB" (a part of the GNU project from the Free Software Foundation) http://sourceware.org/gdb/current/onlinedocs/gdb/Backtrace.html, Web Archieve dated at Dec. 24, 2010, 2 pages.*
Specman, "Cadence Incisive Enterprise Specman Elite Testbench," on the Web at http://www.cadence.com/products/fv/enterprise_specman_elite/pages/default.aspx, Web Archieve dated at Oct. 14, 2011, 2 pages.*
A. Rich, et al., "An Explanation-Based Constraint Debugger," Proceedings of the 5th International Haifa Verification Conference on Hardware and Software: Verification and Testing (HVC '09), Haifa Israel, Oct. 19-22, 2009, pp. 52-56.*
J. Yuan, et al., "Constraint-Based Verification," Springer Science and Business Media, 2006, 258 pages. (Note p. 123).*
B. Patel, et al., "Grasp Systemverilog Testbench Debug and Analysis," EE Times-Asia, Oct. 16-31, 2008, 5 pages.*
T. Viilukas, et al., "Constraint-Based Test Pattern Generation at the Register-Transfer Level," IEEE 13th International Symposium on Design and Diagnostics of Electronic Circuits and Systems (DDECS), 2010, Apr. 14-16, 2010, pp. 352-357, Vienna.*
G. Di-Guglielmo, et al., "Efficient Generation of Stimuli for Functional Verification by Backjumping Across Extended FSMS," Journal of Electronic Testing 27, No. 2, 2011, (Online: Mar. 2011): pp. 137-162.*

* cited by examiner

*Primary Examiner* — Kamini S Shah
*Assistant Examiner* — David M Rogers
(74) *Attorney, Agent, or Firm* — Mark H. Whittenberger, Esq.; Holland & Knight LLP

(57) ABSTRACT

The present disclosure relates to a computer-implemented method for electronic design simulation. The method may include providing, using at least one computing device, an electronic design. The method may also include associating, using the at least one computing device, an identifier with each constraint solver call utilized in a simulation of the electronic design. The method may also include generating, using the at least one computing device, an application programming interface configured to allow a user to navigate through electronic design simulation results based upon, at least in part, the identifier associated with each constraint solver call.

17 Claims, 7 Drawing Sheets

300

SYSTEM AND METHOD FOR IDENTIFYING CONSTRAINT SOLVER CALLS

FIELD OF THE INVENTION

The present disclosure relates to electronic design automation, and more specifically, to a method for identifying constraint solver calls associated with an electronic design simulation.

DISCUSSION OF THE RELATED ART

Electronic design automation (EDA) utilizes software tools that may be used in the design and analysis of numerous electronic systems such as printed circuit boards (PCBs) and integrated circuits (ICs). Verification environments include constraints that describe the relationship between the variables that control the simulation (and sometimes the data that is used as well). Coverage models in the verification environment capture which parts of the solution space have been covered by the stimulus created with the constraints/constraint solver. These coverage models allow the results from many simulations to be merged showing which random variables were chosen. These coverage models are currently created manually, a tedious, complex and error prone task.

SUMMARY OF INVENTION

In one or more embodiments of the present disclosure, a computer-implemented method for electronic design simulation is provided. The method may include providing, using at least one computing device, an electronic design. The method may further include associating, using the at least one computing device, an identifier with each constraint solver call utilized in a simulation of the electronic design. The method may also include generating, using the at least one computing device, an application programming interface configured to allow a user to navigate through electronic design simulation results based upon, at least in part, the identifier associated with each constraint solver call.

One or more of the following features may be included. The method may include associating an identifier with each constraint solver call includes associating a time with each constraint solver call. The method may further include associating a layer identifier with each layer associated with a constraint solver process. In some embodiments, the application programming interface may be configured to provide one or more features, the one or more features including at least one of starting the simulation, stopping the simulation, pausing the simulation, enabling printing of debug information, disabling printing of debug information, enabling testcase generation, disabling testcase generation, enable performance and memory consumption information, disable performance and memory consumption information, and generation of a user-defined script. The method may further include identifying at least one error associated with the simulation. The method may also include providing a location of the at least one error based upon at least in part an identifier associated with the error. In some embodiments, at least one of the one of more features may be associated with a specific constraint solver call.

In some embodiments, a computer-readable storage medium for electronic design simulation is provided. The computer-readable storage medium may have stored thereon instructions that when executed by a machine result in one or more operations. Operations may include providing, using at least one computing device, an electronic design. Operations may further include associating, using the at least one computing device, an identifier with each constraint solver call utilized in a simulation of the electronic design. Operations may also include generating, using the at least one computing device, an application programming interface configured to allow a user to navigate through electronic design simulation results based upon, at least in part, the identifier associated with each constraint solver call.

One or more of the following features may be included. Operations may include associating an identifier with each constraint solver call includes associating a time with each constraint solver call. Operations may further include associating a layer identifier with each layer associated with a constraint solver process. In some embodiments, the application programming interface may be configured to provide one or more features, the one or more features including at least one of starting the simulation, stopping the simulation, pausing the simulation, enabling printing of debug information, disabling printing of debug information, enabling testcase generation, disabling testcase generation, enable performance and memory consumption information, disable performance and memory consumption information, and generation of a user-defined script. Operations may further include identifying at least one error associated with the simulation. Operations may also include providing a location of the at least one error based upon at least in part an identifier associated with the error. In some embodiments, at least one of the one of more features may be associated with a specific constraint solver call.

In one or more embodiments of the present disclosure, a system may include a computing device having at least one processor configured to simulate an electronic design. The at least one processor may be configured to provide an electronic design. The at least one processor may be configured to associate an identifier with each constraint solver call utilized in a simulation of the electronic design. The at least one processor may be configured to generate an application programming interface configured to allow a user to navigate through electronic design simulation results based upon, at least in part, the identifier associated with each constraint solver call.

One or more of the following features may be included. The at least one processor may be configured to associate an identifier with each constraint solver call includes associating a time with each constraint solver call. The at least one processor may be configured to associate a layer identifier with each layer associated with a constraint solver process. In some embodiments, the application programming interface may be configured to provide one or more features, the one or more features including at least one of starting the simulation, stopping the simulation, pausing the simulation, enabling printing of debug information, disabling printing of debug information, enabling testcase generation, disabling testcase generation, enable performance and memory consumption information, disable performance and memory consumption information, and generation of a user-defined script. The at least one processor may be configured to identify at least one error associated with the simulation. The at least one processor may be configured to provide a location of the at least one error based upon at least in part an identifier associated with the error. In some embodiments, at least one of the one of more features may be associated with a specific constraint solver call.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Figure 1:
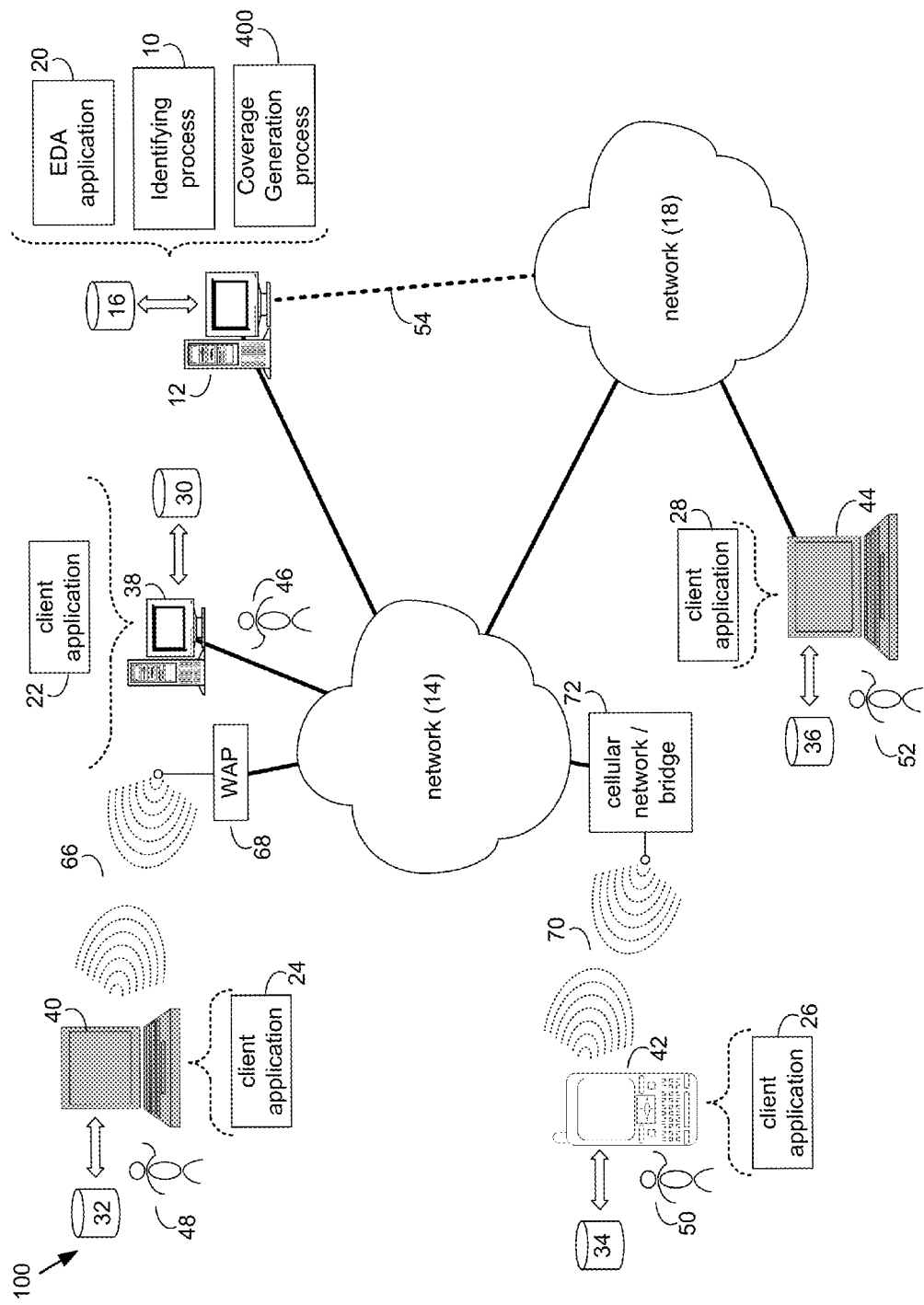
FIG. 1 is a system diagram depicting aspects of the identifying process in accordance with an embodiment of the present disclosure.

Constrained random verification environments may exhibit a number of problems. Some of these may include, but are not limited to, expected values are not reached, the values are chosen less frequently or more frequently than expected, the constraint solver calls take too long to finish, the solver is unable to find a solution for a given constraint set, the solver is unable to find a solution with certain starting conditions including variables that are not random or handles and arrays that are not initialized, the solver runs out of memory, etc. Typical constrained random verification environments use many randomized (constraint solver) calls to determine the configuration of the design being verified and the data used to verify the chosen configuration.

Additionally, time based breakpoint or single stepping techniques for resolving coding mistakes may not work well for solving constraint issues. Many constraint solver calls happen in the same simulator time step. They may also occur before any simulation time has been consumed. The same randomized call may also be called thousands of times in the same simulation, each time with a different seed or different state variables.

Some constraints (e.g. SYSTEMVERILOG) may be expressed in a declarative, not procedural way. Variables related to each other by constraint operators must be solved so that a uniform distribution in the solution space is provided. This usually means that the related variables (known as a variable partition) are solved concurrently. Resolving constraint solver issues presents a unique challenge because of this concurrent processing. A single randomized call may also be broken down by the constraint solver engine into many layers for a variety of reasons, including, but not limited to, the partitioning of variables, solve before constraints, function calls in the constraints, etc. The manner in which the solving process is broken into steps is often not obvious, further complicating the analysis process.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations of the present disclosure may be written in an object oriented programming language such as Java, Smalltalk, C++ or the like.

However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown identifying process 10 and coverage generation process 400 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft® and Windows® are registered trademarks of Microsoft Corporation in the United States, other countries or both; Novell® and NetWare® are registered trademarks of Novell Corporation in the United States, other countries or both; Red Hat® is a registered trademark of Red Hat Corporation in the United States, other countries or both; and Linux® is a registered trademark of Linus Torvalds in the United States, other countries or both.) Additionally/alternatively, the report generation process may reside on and be executed, in whole or in part, by a client electronic device, such as a personal computer, notebook computer, personal digital assistant, or the like.

The instruction sets and subroutines of identifying process 10 and coverage generation process 400, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: MICROSOFT IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for report generation. EDA application 20 may be referred to herein as a design tool.

Identifying process 10 and coverage generation process 400 may each be a stand alone application, or may be an applet/application/script that may interact with and/or be executed within EDA application 20. In addition/as an alternative to being a server-side process, the browsing process may be a client-side process (not shown) that may reside on a client electronic device (described below) and may interact with an EDA client application (e.g., one or more of EDA client applications 22, 24, 26, 28). Further, the browsing process may be a hybrid server-side/client-side process that may interact with EDA application 20 and an EDA client application (e.g., one or more of client applications 22, 24, 26, 28). As such, the browsing process may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize identifying process 10 and coverage generation process 400.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to MICROSOFT WINDOWS, Microsoft Windows CE®, RED HAT LINUX, or other suitable operating system. (Windows CE is a registered trademark of Microsoft Corporation in the United States, other countries, or both.).

Figure 2:
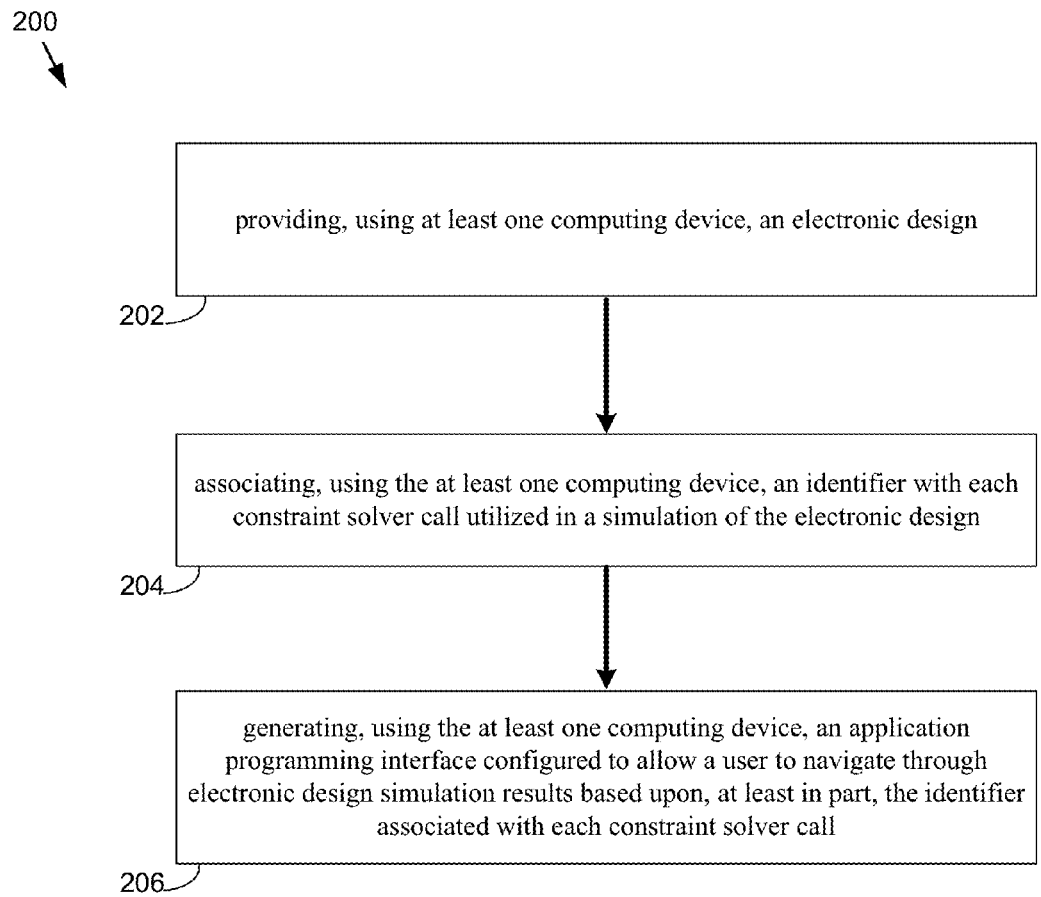
FIG. 2 is a flowchart depicting operations consistent with the identifying process of the present disclosure.

As shown in FIG. 2, and as will be discussed in further detail below, identifying process 10 may include providing (202) an electronic design. Identifying process 10 may further include associating (204) an identifier with each constraint solver call utilized in a simulation of the electronic design. Identifying process 10 may also include generating (206) an application programming interface configured to allow a user to navigate through electronic design simulation results based upon, at least in part, the identifier associated with each constraint solver call.

In some embodiments, during the simulation of an electronic design the verification environment may ask the constraint solver to return one or more sets of values that meet the specified constraints. For example, if a video core is being tested the first choice may be which codec to use from a list (e.g., MP4, H.264, WMV, AVI, etc.). The next choice may be which screen resolution to use (e.g., 1024×768, 1600×1024, 1900×1200, etc.). Each of these choices could be made with a separate constrained call to the constraint solver. In a real verification environment there may be thousands of calls. If there is an issue with the call to the constraint solver then it can be difficult to identify the constraint solver call in a way that both the engineer and simulator can understand. It is also important to be able to return to exactly the same constraint solver call after an issue in the constraints has been fixed to validate the fix. Each individual constraint solver can be further sub-divided into solve before layers. This can happen manually using "solve before" statements and can happen automatically if there is a construct in the constraints like a function call that is not transparent to the constraint solver. Again, it is vital for resolving issues, improving performance and reducing memory consumption that the engineer can return to a specific solve before layer in a specific constraint solver call quickly. The results from the constraint solver call often drive decision points in the simulation, branches where the simulation branches to cover a certain area of the design solution space. Knowing the constraint solver output, and the memory and performance profile of the simulator can help isolate and resolve simulation and verification environment issues. Traditional profiling solutions are time based. As many constraint solver calls can happen on the same time step there are many issues that are hard to resolve using time based methods.

Accordingly, identifying process 10 described herein may enable a unique numbering system for each constraint solver call. Additionally and/or alternatively, identifying process 10 may be configured to uniquely number each layer of the constraint solving process. Identifying process 10 may be configured to allow for the generation of an application programming interface ("API") based on these unique numbers that may provide the user with various controls. Some of these controls may include, but are not limited to, starting, stopping, and/or pausing the simulation, the enabling and/or disabling of the printing of debugging information, the enabling and/or disabling of testcase generation for the constraint solver, the enabling and/or disabling of performance and memory consumption information. Identifying process 10 may also be configured to allow the user to run a user defined script when the constraint solver runs.

In this way, identifying process 10, by uniquely numbering each constraint solver call and uniquely numbering each layer, may allow the engineer controlling the simulation to return to a specific constraint solver call. Additionally and/or alternatively, from this point in the simulation, identifying process 10 may enable or disable additional debug information and may generate memory and performance profile data from the simulator at specific points in the simulation. Identifying process 10 may also be configured to automatically generate test case and debug information at a specific constraint solver call. Identifying process 10 may also be configured to automatically generate performance and memory consumption information about the verification environment when the constraint solver runs and/or at interesting branch points in the simulation. Identifying process 10 may also be configured to generate performance and memory consumption data about specific constraint solver calls.

Accordingly, identifying process 10 may be configured to allow users to visualize the impact of their constraints and to quickly return to the point in a simulation where the constraint solver gave undesirable results, caused simulation memory to grow and/or took an extended period of time to solve. Identifying process 10 may be configured to allow users to assess the impact of changes that were made in the verification environment.

Figure 3:
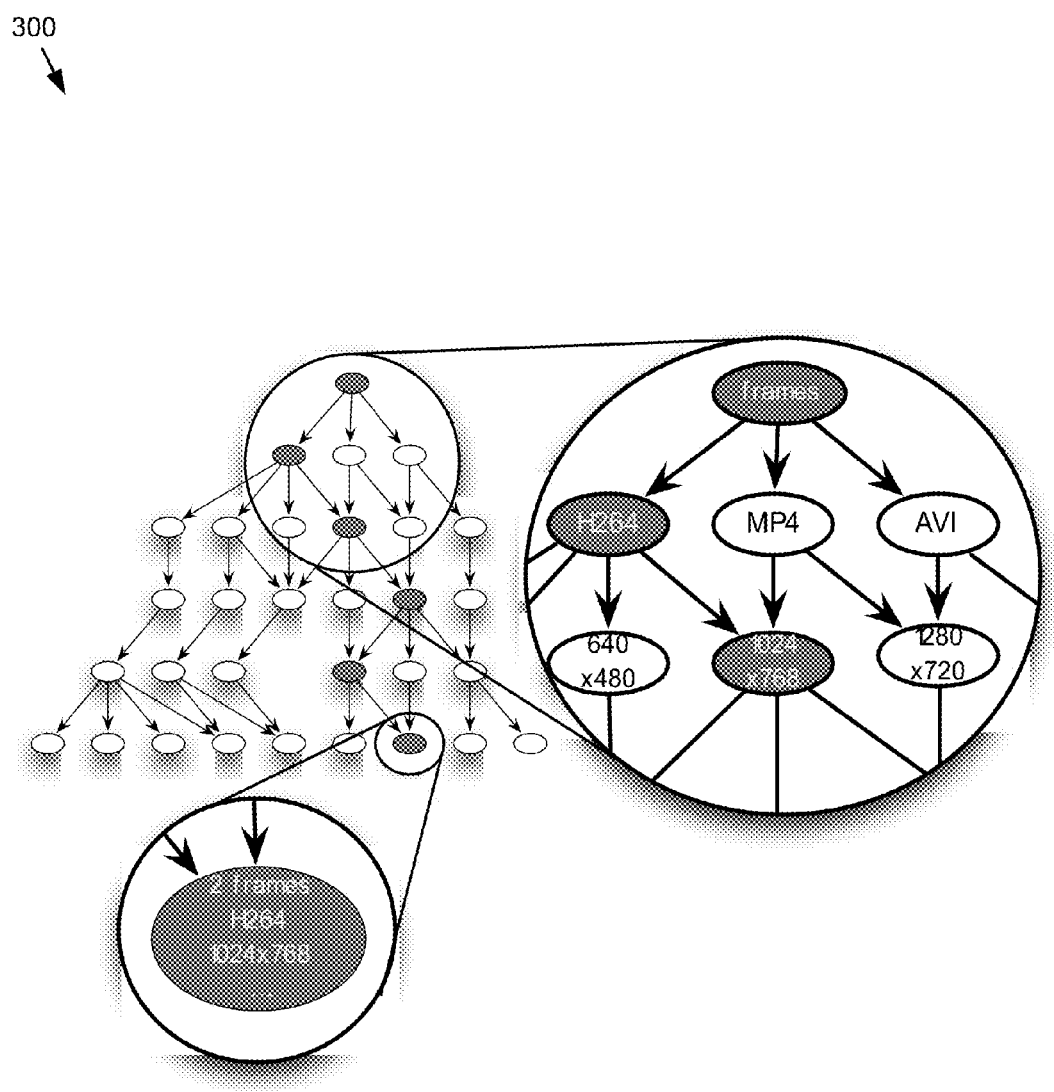
FIG. 3 is a schematic depicting aspects of the identifying process in accordance with an embodiment of the present disclosure.

Referring now to FIG. 3, an embodiment depicting an example verification environment that may be used to verify a video core is provided. In this constrained random environment a randomize call may be used to determine the configuration of the device under test (DUT). There are many constraint solver calls but the highlighted call calculates the configuration of the design. This may be applicable for other constraint calls but in this case configuration has been chosen. In the individual test described in FIG. 3, 2 frames, a H264 decoder and a screen resolution of 1024×768 have been selected as indicated by the shaded sections shown in FIG. 3. As discussed herein, identifying process 10 may be configured to allow a constraint call to be identified. Accordingly, the simulation may be automatically stopped when it reaches the constraint call and many iterations run on the same call with different seeds. A verification environment may include thousands of similar calls, each call determining the configuration or data for a certain part of the environment. The values chosen by the early constraint solver calls may exclude other constraint solver calls from being executed. The first step in resolving the issues described above is to label the constraint solver calls. Embodiments included here may be configured to perform this automatically.

Embodiments described herein may provide various types of feedback to the user. For example, in some embodiments, the source file and line number where the randomize call is located may be shown first, then the text of that randomize call may be shown. This may be followed by the type of the object being randomized, then the seed used for that particular randomize call. When the randomize call ends that may be noted in the debug output which may include the memory and CPU time used for this call and the cumulative values for memory and CPU time. These values may be specified for various components of randomization. For example, in SYSTEMVERILOG, SVRNC is the language processing layer and RNC which is the constraint solver. Additionally and/or alternatively, a randomized call where the solver uses an excessive amount of time or memory to solve the constraints may be readily indicated by showing the start and end points of the randomization call and the memory and CPU time consumed. If the user is debugging a randomized problem deep into the simulation and wants to avoid filling up their log files with this type of output they can delay its initiation using an environment variable.

Figure 4:
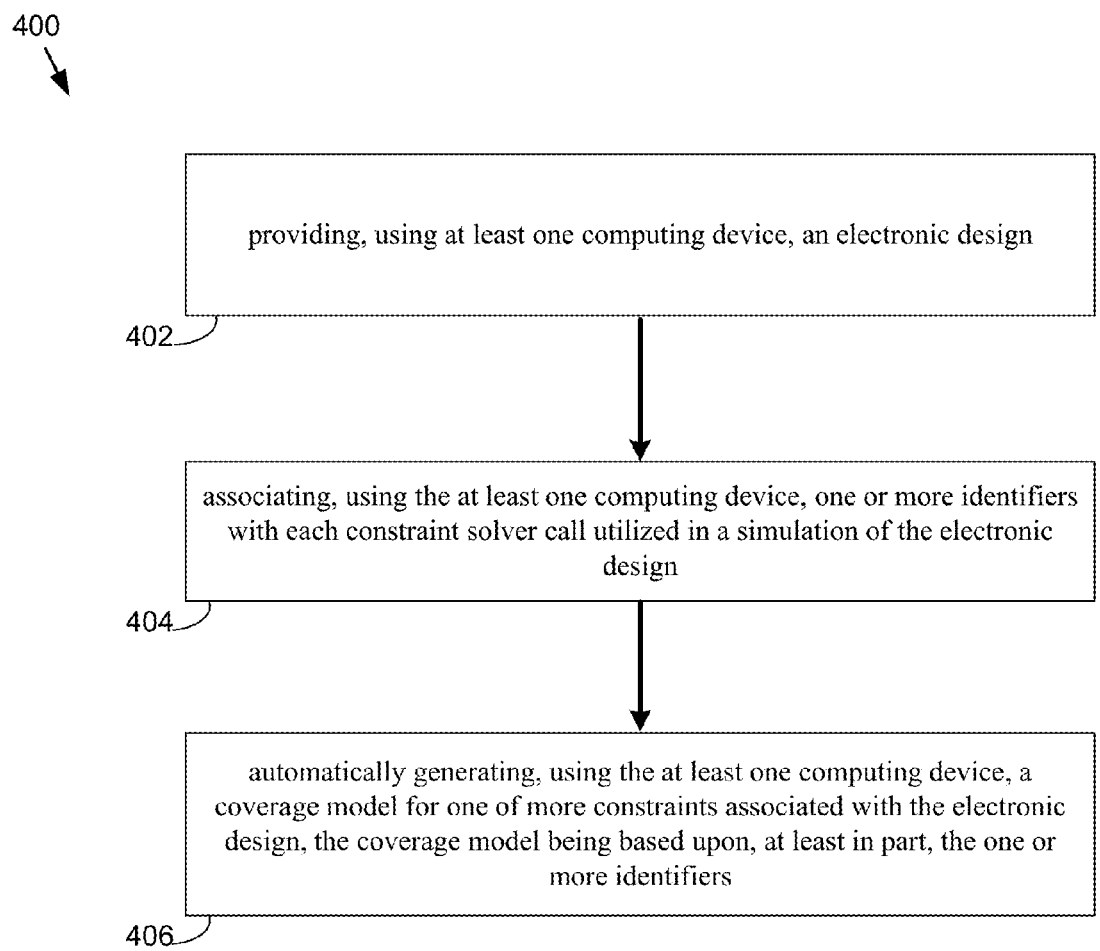
FIG. 4 is a flowchart depicting operations consistent with the coverage generation process of the present disclosure.

Referring now to FIG. 4, and as will be discussed in further detail below, coverage generation process 400 may include providing (402), using at least one computing device, an electronic design. Coverage generation process 400 may further include associating (404), using the at least one computing device, one or more identifiers with each constraint solver call utilized in a simulation of the electronic design. Coverage generation process 400 may further include automatically generating (406), using the at least one computing device, a coverage model for one or more constraints associated with the electronic design, the coverage model being based upon, at least in part, the one or more identifiers.

As discussed above, verification environments may include constraints to describe the relationship between the variables that control the simulation (and sometimes the data that is used as well). Coverage models in the verification environment may be used to capture those parts of the solution space that have been covered by the stimulus created with the constraints/constraint solver. These coverage models may allow the results from many simulations to be merged showing which random variables were chosen. In existing solutions, the coverage models are currently created manually, a tedious, complex and error prone task.

Accordingly, the coverage generation process 400 described herein may be configured to generate the coverage models automatically from the constraints that already exist in the environment. In this way, coverage generation process 400 may be configured to iterate the constraint solver on a specific constraint rather than running it once to allow the distribution of results to be collected.

In this way, coverage generation process 400 may eliminate the requirement of the verification engineer having to write complex cover groups manually. Coverage generation process 400 may be configured to generate the cover groups (e.g. SYSTEMVERILOG) automatically saving considerable time and mistakes. As a result, the user (e.g. verification engineer) need not run thousands of simulations taking significant time, coverage generation process 400 may iterate on a specific constraint a user selectable number of times to generate the range of likely values. This is in contrast to existing solutions that require manual generation of cover groups.

In some embodiments, coverage generation process 400 may utilize a unique numbering scheme for constraint solver calls as discussed above. In this way, the user can specify a specific constraint solver call to analyze and may analyze the coverage model using a constraint solver. Accordingly, when the simulation reaches this point coverage generation process 400 may identify the number and type of random variables associated with each constraint solver call. Coverage generation process 400 may also know the type and value state (e.g. fixed—not random) variables. The values of the state variables may be dependent on earlier constraint solutions which is why it is important that the specific constraint solver call can be identified. The random, state and class structure for the solve may be written out making an environment that only expresses this one constraint problem. This may pull all of the constraints that could be widely separated in the original environment into this smaller example, which is likely much smaller than the original environment. The constraint solver may then iterate on the constraint problem writing out the results. This may give an indication of the possible solutions and the distribution of those solutions.

Using the coverage generation process 400 described herein changes in constraints may be quickly implemented and tested using the small environment. If the user believes that the constraint solver is choosing incorrect values or not finding values that are legal this may allow them to share a small, automatically generated test case without having to expose the intellectual property in their main environment. This small test case may be ideal for the regression environment ensuring that the issue will be trapped should it reoccur. It will also minimize the time spent by field personnel as they will not have to work on the test case, just implementing the fix. It may take many hours of simulation to reach this constraint solving problem in the main environment. Writing out a small test case allows the user to quickly test solutions.

In some embodiments, additional information about the internal operations of a randomized call can be enabled using an environment variable. The additional information displayed as a result of setting this environment variable may include, but is not limited to, the partitions of variables that are related by constraint operators, the order in which variable partitions are solved, the order in which variables within a partition are solved, the properties of variables during the solving of a partition, e.g., random, state variable (i.e., not random) and previously solved, etc.

Figure 5:
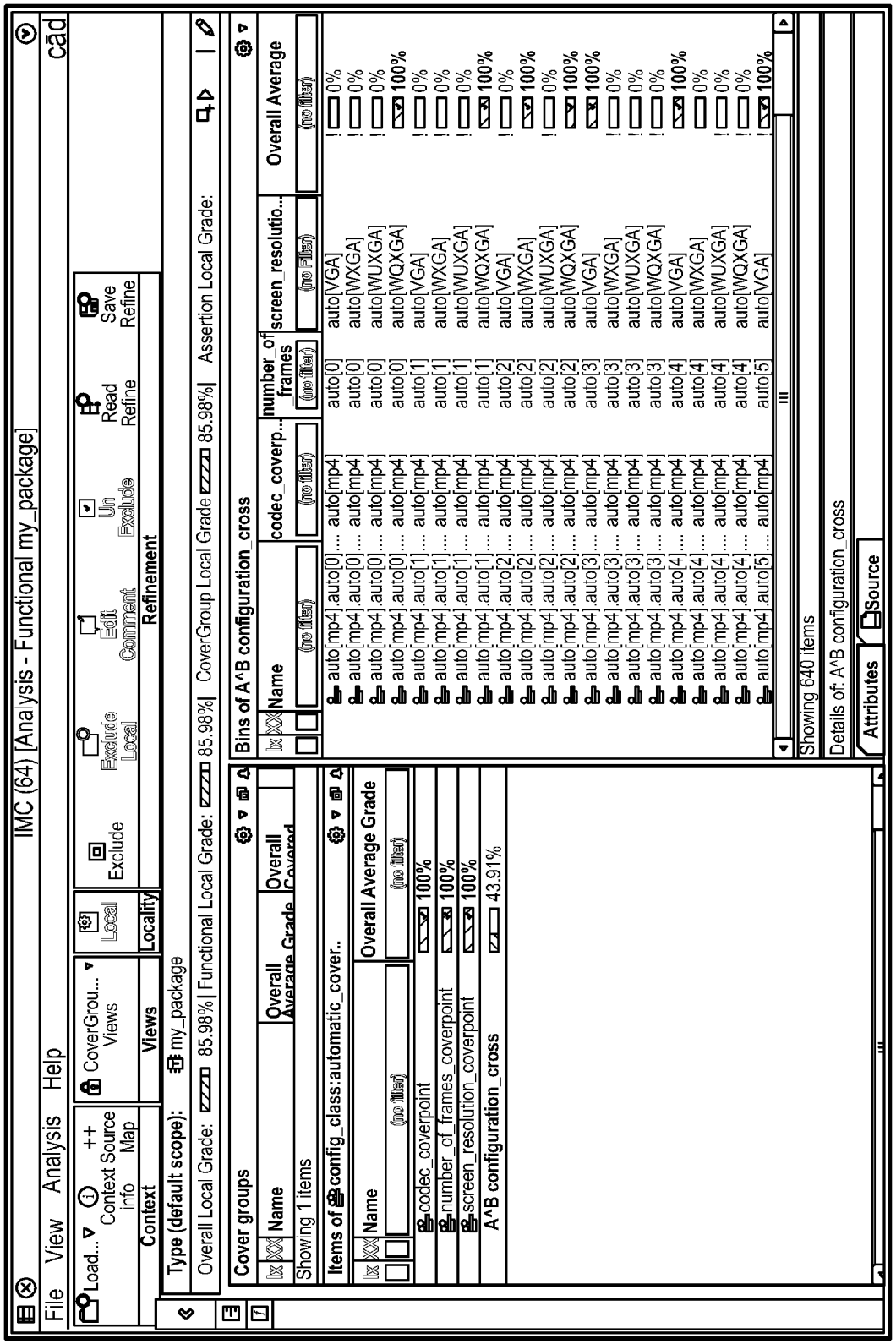
FIG. 5 is a user interface depicting aspects of the identifying process in accordance with an embodiment of the present disclosure.
Figure 6:
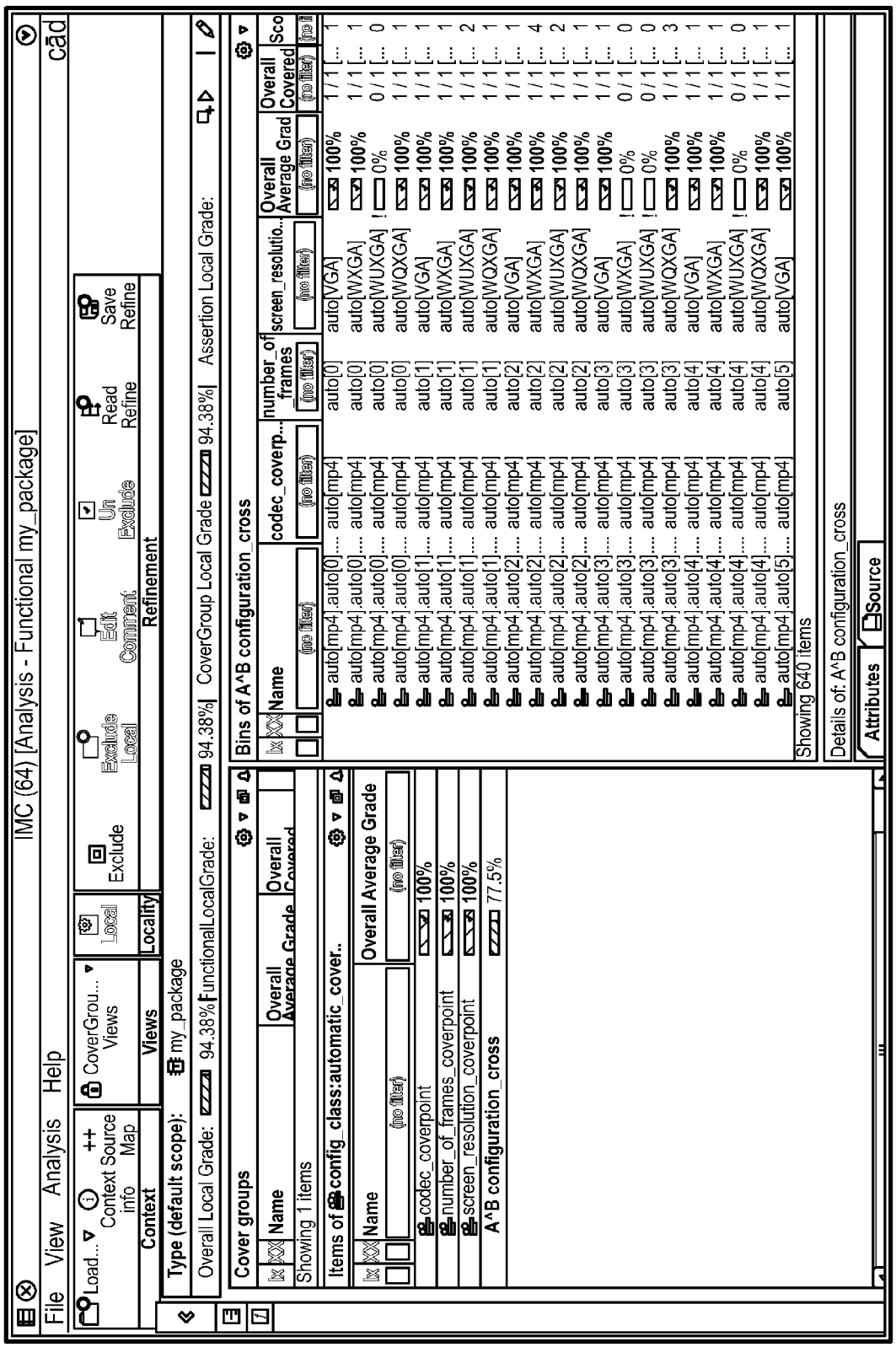
FIG. 6 is a user interface depicting aspects of the identifying process in accordance with an embodiment of the present disclosure.
Figure 7:
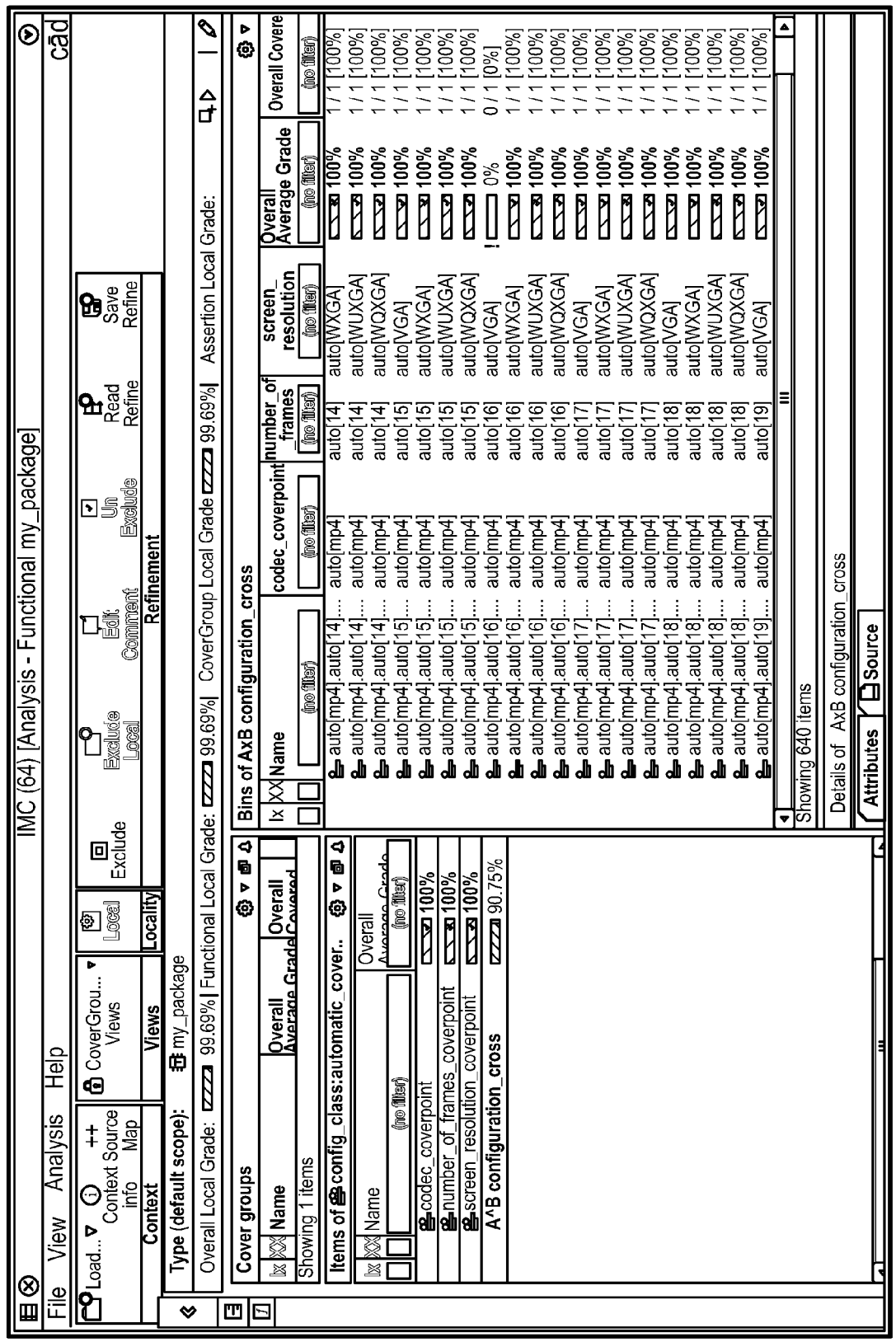
FIG. 7 is a user interface depicting aspects of the identifying process in accordance with an embodiment of the present disclosure.

Referring now to FIGS. 5-7, embodiments depicting simulation reports generated in accordance with coverage generation process 400 are provided. Each simulation report may include simulation results associated with the coverage model. Coverage generation process 400 may also be configured to identify a failed subset of the electronic design based upon the simulation report.

In some embodiments, as the regression runs coverage generation process 400 may then indicate the coverage of the configuration that has been reached. This can be seen in FIGS. 5-7. FIG. 5 depicts the results after 50 simulations, FIG. 6 depicts the results after 150 and FIG. 7 depicts the results after 300. Existing solutions require that the code to generate this coverage information be generated manually. Automating this process via coverage generation process 400 minimizes time, eliminates some errors and allows the coverage information to be quickly updated as the constraints change. This information may be further processed to calculate the advantage of running further simulations.

TABLE 1

Regression metrics:

500 iterations were seen of which 81 were unique
In the 50 iterations 1 to 50 there were 0 configurations that had been previously seen
In the 50 iterations 51 to 100 there were 18 configurations that had been previously seen
In the 50 iterations 101 to 150 there were 39 configurations that had been previously seen
In the 50 iterations 151 to 200 there were 46 configurations that had been previously seen
In the 50 iterations 201 to 250 there were 43 configurations that had been previously seen
In the 50 iterations 251 to 300 there were 45 configurations that had been previously seen
In the 50 iterations 301 to 350 there were 47 configurations that had been previously seen
In the 50 iterations 351 to 400 there were 50 configurations that had been previously seen
In the 50 iterations 401 to 450 there were 50 configurations that had been previously seen
In the 50 iterations 451 to 500 there were 50 configurations that had been previously seen In existing solutions, the information shown in Table 1 may be gathered by running thousands of simulations and then merging the data in groups to see the impact of adding more simulations. This process needs to be repeated when the stimulus constraints change. Many project teams decide to run more tests (in some cases thousands) to ensure they are reaching all of the coverage that they can based on the constraints they have with little or no information on the impact of these tests. In contrast, coverage generation process 400 allows this information to be gathered quickly from one simulation run and processed automatically (and quickly) saving many hours of manual work and computer time. It should be noted that this particular example does not demonstrate that the configurations can be filtered into a list only containing unique, legal configurations. Each simulation on the simulation grid can then use a line from the file to ensure it is running a unique configuration. This eliminates the replication that occurs when many simulations randomly select the same configuration, which may allow coverage closure to be reached much faster.

In some embodiments, EDA application 20 may be configured to perform testbench automation, reuse, and analysis to verify designs from the system level, through RTL, to the gate level. EDA application 20 may support a metric-driven approach and may utilize a native-compiled architecture in order to speed the simultaneous simulation of transaction-level, behavioral, low-power, RTL, and gate-level models.

In some embodiments, EDA application 20 may support a variety of languages and/or standards. Some of these may include, but are not limited to, IEEE-standard languages, the OPEN VERIFICATION METHODOLOGY (OVM), the emerging ACCELLERA UNIVERSAL VERIFICATION METHODOLOGY (UVM), and the E REUSE METHODOLOGY (eRM). EDA application 20 may support one or more software extensions, which may provide a high-throughput channel between the testbench and the device under test (DUT), and enable automated metric driven verification of embedded software exactly as if it were another part of the DUT.

Accordingly, EDA application 20 may be configured to fuel testbench automation, analysis, and reuse for increased productivity. EDA application 20 may be configured to ensures verification quality by tracking industry-standard coverage metrics, including functional, transactional, low-power, and HDL code, plus automatic data and assertion checking. EDA application 20 may be configured to drive and/or guide verification with an automatically backannotated and executable verification plan. EDA application 20 may be configured to create reusable sequences and multi-channel virtual sequences on top of a multi-language verification environment and to configure existing Universal Verification Components (UVCs) or quickly constructs all-new UVCs. EDA application 20 may be configured to enable advanced debug for transaction-level models, SYSTEM-VERILOG/e class libraries, transient mixed-signal, low-power, and traditional waveform analysis.

In some embodiments, EDA application 20 may supports E, OPEN VERIFICATION LIBRARY (OVL), OVM class library, emerging UVM class library, SystemC®, SYSTEMC VERIFICATION LIBRARY, SYSTEM-VERILOG, Verilog®, VHDL, PSL, SVA, CPF, as well as numerous other languages. EDA application 20 may be used in accordance with mixed-language, mixed-signal, and low-power designs, across multiple levels of abstraction, and may include the ability to "hot swap" the RTL simulation in/out of numerous accelerators/emulators.

As used in any embodiment described herein, the terms "circuit" and "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof. Embodiments of the present disclosure may be incorporated in whole or in part into any design tools.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for electronic design simulation comprising:

providing, using at least one computing device, an electronic design;

associating, using the at least one computing device, an identifier with each constraint solver call, of a plurality of constraint solver calls, wherein each constraint solver call is utilized in a simulation of the electronic design wherein associating an identifier with each constraint solver call includes associating a time with each constraint solver call;

generating, using the at least one computing device, an application programming interface configured to allow a user to navigate through electronic design simulation results based upon, at least in part, the identifier associated with each constraint solver call; and associating a layer identifier with each layer, of one or more layers, associated with a constraint solver process, wherein the application programming interface is generated based upon the layer identifier and the application programming interface provides the user with a plurality of user-selectable features.

2. The computer-implemented method of claim 1, wherein the one or more features includes at least one of starting the simulation, stopping the simulation, pausing the simulation, enabling printing of debug information, disabling printing of debug information, enabling testcase generation, disabling testcase generation, enable performance and memory consumption information, disable performance and memory consumption information, and generation of a user-defined script.

3. The computer-implemented method of claim 2, wherein at least one of the one or more features is associated with a specific constraint solver call.

4. The computer-implemented method of claim 1, further comprising:
identifying at least one error associated with the simulation.

5. The computer-implemented method of claim 4, further comprising:
providing a location of the at least one error based upon at least in part an identifier associated with the error.

6. The method of claim 1, wherein the time is a time of day.

7. A non-transitory computer-readable storage medium for electronic design simulation, the computer-readable storage medium having stored thereon instructions that when executed by a machine result in the following operations:
providing, using at least one computing device, an electronic design;
associating, using the at least one computing device, an identifier with each constraint solver call, of a plurality of constraint solver calls, wherein each constraint solver call is utilized in a simulation of the electronic design wherein associating an identifier with each constraint solver call includes associating a time with each constraint solver call;
generating, using the at least one computing device, an application programming interface configured to allow a user to navigate through electronic design simulation results based upon, at least in part, the identifier associated with each constraint solver call; and
associating a layer identifier with each layer, of one or more layers, associated with a constraint solver process, wherein the application programming interface is generated based upon the layer identifier and the application programming interface provides the user with a plurality of user-selectable features.

8. The computer-readable storage medium of claim 7, wherein the one or more features includes at least one of starting the simulation, stopping the simulation, pausing the simulation, enabling printing of debug information, disabling printing of debug information, enabling testcase generation, disabling testcase generation, enable performance and memory consumption information, disable performance and memory consumption information, and generation of a user-defined script.

9. The computer-readable storage medium of claim 8, wherein at least one of the one or more features is associated with a specific constraint solver call.

10. The computer-readable storage medium of claim 7, further comprising:
identifying at least one error associated with the simulation.

11. The computer-readable storage medium of claim 10, further comprising:
providing a location of the at least one error based upon at least in part an identifier associated with the error.

12. The computer-readable storage medium of claim 7, wherein the time is a time of day.

13. A system for electronic design simulation comprising:
a computing device having at least one processor configured to simulate an electronic design, the at least one processor further configured to associate an identifier with each constraint solver call, of a plurality of constraint solver calls, wherein each constraint solver call is utilized in a simulation of the electronic design, wherein associating an identifier with each constraint solver call includes associating a time with each constraint solver call, the at least one processor further configured to generate an application programming interface configured to allow a user to navigate through electronic design simulation results based upon, at least in part, the identifier associated with each constraint solver call, the at least one processor further configured to associate a layer identifier with each layer, of one or more layers, associated with a constraint solver process, wherein the application programming interface is generated based upon the layer identifier and the application programming interface provides the user with a plurality of user selectable features.

14. The system of claim 13, wherein the one or more features includes at least one of starting the simulation, stopping the simulation, pausing the simulation, enabling printing of debug information, disabling printing of debug information, enabling testcase generation, disabling testcase generation, enable performance and memory consumption information, disable performance and memory consumption information, and generation of a user-defined script.

15. The system of claim 13, wherein the one or more processors are further configured to identify at least one error associated with the simulation.

16. The system of claim 15, wherein the one or more processors are further configured to provide a location of the at least one error based upon at least in part an identifier associated with the error.

17. The system of claim 13, wherein the time is a time of day.

* * * * *